United States Patent
Laverty et al.

(10) Patent No.: US 6,419,725 B1
(45) Date of Patent: Jul. 16, 2002

(54) PROCESS OF FORMING A PERMEABLE GAS SEPARATION MATERIAL

(75) Inventors: Brendan William Laverty, West Bridgford (GB); Geta Chowdhury, Ottawa (CA); Ranka Vujosevic, Ottawa (CA); Shengzhi Deng, Ottawa (CA); Boping Yao, Toronto (CA); Takeshi Matsuura, Ottawa (CA)

(73) Assignee: Lattice Intellectual Property Ltd., London (GB)

( * ) Notice: Subject to any disclaimer, the term of this patent is extended or adjusted under 35 U.S.C. 154(b) by 0 days.

(21) Appl. No.: 09/622,227

(22) PCT Filed: Feb. 1, 1999

(86) PCT No.: PCT/GB99/00135

§ 371 (c)(1),
(2), (4) Date: Nov. 20, 2000

(87) PCT Pub. No.: WO99/42204

PCT Pub. Date: Aug. 26, 1999

(30) Foreign Application Priority Data

Feb. 18, 1998 (GB) ............................................. 9803332
Jun. 8, 1998 (GB) ............................................. 982239

(51) Int. Cl.$^7$ ......................... B01D 53/22; B01D 69/12
(52) U.S. Cl. ...................... 95/45; 95/48; 95/51; 96/13; 96/14; 55/524; 55/DIG. 5
(58) Field of Search ............................. 95/45–55; 96/4, 96/8, 13, 14; 55/524, DIG. 5

(56) References Cited

U.S. PATENT DOCUMENTS

| | | | | |
|---|---|---|---|---|
| 3,528,858 A | * | 9/1970 | Hodgdon, Jr. et al. | 136/86 |
| 3,735,559 A | * | 5/1973 | Salemme | 55/16 |
| 3,780,496 A | * | 12/1973 | Ward, II et al. | 55/16 |
| 4,530,703 A | * | 7/1985 | Malon et al. | 96/13 X |
| 4,586,939 A | * | 5/1986 | Li | 55/16 |
| 4,652,283 A | | 3/1987 | Zampini et al. | |
| 4,840,646 A | * | 6/1989 | Anand et al. | 96/13 X |
| 4,971,695 A | * | 11/1990 | Kawakami et al. | 96/14 X |
| 5,000,763 A | * | 3/1991 | Sanders, Jr. et al. | 96/14 X |
| 5,348,569 A | * | 9/1994 | Bikson et al. | 96/13 X |
| 5,364,454 A | * | 11/1994 | Bikson et al. | 96/13 X |

FOREIGN PATENT DOCUMENTS

| | | | | |
|---|---|---|---|---|
| EP | 0301597 | * | 2/1989 | 96/13 |
| EP | 0409265 | * | 1/1991 | |
| GB | 1039443 | | 8/1966 | |
| GB | 1267167 | * | 3/1972 | |

OTHER PUBLICATIONS

R.T. Chern, "A note on the effects of mono– and di–bromination on the effects of properties of poxide)", J. Membr. Sci. vol. 48, No. 23, pp. 333–341, Feb. 1990.*

H. Fu, "Studies on the Sulfonation of Poly(phenylene Oxide) (PPO) & Permeation Behaviour of Gases and Water –Vapour Through Sulfonated PPO Membranes II", J. Applied Polymer Sci., vol. 51, No. 8, pp. 1405–1409, Feb. 22, 1994.*

Chemical Abstracts, vol. 114, No. 24, Abstacts No. 229415, Jun. 17, 1991.*

Chemical Abstracts, vol. 105, No. 20, Abstract No. 173182, Nov. 17, 1986.*

* cited by examiner

Primary Examiner—Robert H. Spitzer
(74) Attorney, Agent, or Firm—Larson & Taylor PLC

(57) ABSTRACT

The process is characterised by sulfonating a partially brominated poly(phenylene oxide). The gas separation material so formed may be made into a membrane and is useful in separating component gases from a gas mixture.

9 Claims, No Drawings

PROCESS OF FORMING A PERMEABLE GAS SEPARATION MATERIAL

FIELD OF THE INVENTION

The present invention relates to a process of forming a permeable gas separation material.

BACKGROUND OF THE INVENTION

Poly(phenylene oxide) (PPO) is known as a moderately permeable polymer membrane material having alternating aromatic cycles and C-O linkages in the main chain. Among the many aromatic polymers having a high glass transition temperature, PPO shows the highest permeability to gases, higher than polysulfone or bisphenyl-A-polycarbonate which have rather similar structures of repeat units. Whatever the reason for this, PPO has received significant attention as a permselective material.

However, measurements of separation factors for PPO have not been fully consistent, possibly because PPO can crystallise under some conditions and variations in crystallinity can cause variations in permeability.

It has been proposed to increase the permeability of PPO by the introduction of bulky substituents.

Thus, European patent application EP 0 360 318 (Eniricerche SpA) describes a modified poly (2,6-dimethyl-p-oxyphenylene) with a glass transition temperature in the range 180° to 220° C. containing a hydroxy butyl group replacing the methyl group in the 2-position, or a hydroxyethyl group in the 3-position.

United States patent U.S. Pat. No. 5,169,416 (Pedretti et al. / Snam SpA et al.) describes a process of modifying PPO by introducing a trialkylsilyl halide substituent group.

United States patent U.S. Pat. No. 4,586,939 (Li / The Standard Oil Company) describes PPO which is substituted in the 3-and 5-positions with a radical larger than chloride, such as bromide.

Gas separation membranes prepared from PPO of low molecular weight have a tendency to rupture.

An important property of a gas separation membrane is its permselectivity, especially if one or more components of the gas mixture comprise polar molecules. In fact, for such mixtures, permselectivity is more important than permeability.

It is an object of the present invention to provide a permeable gas separation material having good mechanical strength and good permselectivity.

SUMMARY OF THE INVENTION

We have discovered that this object, and other useful benefits, can be achieved by sulphonating a partially brominated PPO.

Thus, according to the invention there is provided a process of forming a permeable gas separation material characterised by sulfonating a partially brominated poly (phenylene oxide).

The partially brominated PPO, which is used as a starting material for the sulfonation process, preferably is from 20% to 60% brominated PPO.

The partially brominated PPO is preferably partially brominated poly (2,6dimethyl-1,4-phenylene oxide), although the invention is equally applicable to partially brominated poly (phenylene oxide)s after other structures, for example where the substituents at the 2- and 6- positions are selected independently from $C_1$ to $C_8$ aliphatic, $C_5$ to $C_7$ cycloaliphatic, $C_1$ to $C_8$ alkoxy; $C_6$ to $C_{12}$ aromatic radicals or inert substituted derivatives thereof.

The process may comprise reacting the partially brominated PPO with a sulfonating agent in a non-polar solvent, for example using a procedure similar to the known procedure for sulfonating low MW PPO. The sulfonating agent is typically chlorosulfonic acid. The non-polar solvent may be chloroform. The concentration of the PPO in the non-polar solvent is preferably less than 10% by weight. Sufficient sulfonating agent may be used to nominally sulfonate un-reacted repeat units in the partially brominated PPO.

The gas separation material formed by the process according to the invention may be made into a membrane. A membrane may be formed by coating a flat surface or the lumen or the shell side of hollow fibres with dilute solutions of the modified polymer in a suitable solvent and allowing the solvent to evaporate.

The invention also provides a method of separating component gases from a gas mixture, comprising contacting the gas mixture with a gas separation material formed by sulfonating a partially brominated PPO.

The preferred gas separation material as formed by sulfonating a partially brominated PPO, has a $CO_2/CH_4$ permeability ratio of at least 51.0 for pure gases and/or a $CO_2/CH_4$ separation factor of at least 22, measured with a $CO_2/CH_4$ mixture containing 19.3% $CO_2$.

The invention will now be further described, with reference to the following non-limiting examples.

EXAMPLES

A PPO polymer where [n] =1.7 to 1.8 dl/g, ex General Electric, was used as a starting material.

Preparation of Partially Brominated PPO 10 g of PPO was dissolved in about 325 ml of chloroform in a reaction kettle covered with aluminium foils to exclude direct light. 1.0 ml of bromine in 20 ml chloroform was added from a separating funnel to the PPO solution over a period of 1 to 2 minutes, under a nitrogen atmosphere. Stirring of the solution was carried out continuously during addition of the bromine solution and was continued for another 1.5 hours after the addition was complete. The solution was then precipitated in excess of methanol with vigorous stirring. The precipitate was washed 2 or 3 times in methanol, soaked in methanol overnight, filtered and then dried under ambient conditions and finally in a vacuum oven until ready for use. The degree of bromination was determined by H-NMR and was calculated to be in the range of 20 to 22%, for different reaction batches. This material was designated as PPOBr20.

The above process was modified by using 10.0 g of PPO dissolved in about 350 ml of chloroform. 2.0 ml of bromine in about 50 ml of chloroform was added over 2 minutes. The degree of substitution was 39 to 41%. The product was designated as PPOBr40.

The above process was modified again by using 20.0 g of PPO dissolved in about 500 ml of chloroform. 2.5 ml of bromine in about 50 ml of chloroform was added over 20 minutes. The degree of substitution was 60%. The product was designated as PPOBr60.

In all of the above procedures, only ring bromination took place. NMR analysis did not show any methyl bromination.

Sulfonation of PPOBr

The PPOBr samples prepared as described above were sulfonated by reacting a 2% by weight solution of the partially brominated polymer with a stoichiometric amount of chlorosulfonic acid. The amount of chlorosulfonic acid required for the reaction was based on the amount of un-reacted repeat units in the PPOBr molecules. Thus, in the case of PPOBr20, 5 g of the polymer was assumed to contain 4 g of non-brominated groups and the amount of chlorosulfonic acid used was calculated accordingly. The sulfonated polymers were designated as SPPOBr20, SPPOBr40 and SPPOBr60 respectively.

For all three different samples of partially brominated PPO, the target I.E.C. for the sulfonated polymer was 2.0 meq/g of dry polymer. Actual results determined by the titration method were as follows:

| Polymer | I.E.C. (meq/g of dry polymer) |
| --- | --- |
| SPPOBr20 | 1.78 |
| SPPOBr40 | 1.47 |
| SPPOBr60 | 1.01 |

Preparation and Testing of Homogeneous Membranes Made from Modified PPO

Homogeneous membranes were made from 3% by weight solutions of sulfonated partially brominated PPO.

In the case of SPPOBr60, a 3% by weight solution of the polymer was made in a 30/70 by weight ratio of methanol and chloroform. In the case of SPPOBr40 and SPPOBr20, a 3% by weight solution of the polymer was made in a 45/55 by weight ratio of methanol and chloroform. In each case, about 2.5 ml of the solution was poured into a metal ring of 9.6 cm inner diameter placed on a glass plate. Small pieces of adhesive tape were used to hold the ring in place and to prevent leakage of the solution from underneath the ring. The ring with the solution in it was covered on top with a 15 cm diameter Wattman (Trade Mark) filter paper to enable slow evaporation of the solvent. The solution was left in the casting box for 24 hours at room temperature. The glass plate was levelled in order to avoid differences in membrane thickness. After 24 hours of evaporation, the glass plate was immersed in distilled water, the membrane surfaces were wiped with a low lint wiper and vacuum dried at room temperature for a minimum of 3 days or until ready to be used.

Single Gas Permeation Tests

Permeation rates of single gases were tested at 100 psia upstream pressure. The downstream pressure was assumed to be negligible compared with the upstream pressure. Therefore a constant pressure difference of 100 psia was assumed between the feed and the permeate. The results are as set out in the following Table 1.

TABLE 1

| POLYMER | Intrinsic Permeability | | | Permeability Ratio | | | |
| --- | --- | --- | --- | --- | --- | --- | --- |
| | IEC meq/g | Barrer N2 | O2 | CO2 | CH4 | O2/N2 | CO2/CH4 |
| SPPOBr60 | 1 | 2.92 | 15.96 | 112.5 | 3.83 | 5.47 | 29.37 |
| SPPOBr40 | 1.47 | 0.79 | 5.17 | 27.22 | 0.53 | 7.22 | 51.39 |
| SPPOBr20 | 1.8 | 1.53 | 9.09 | 39.8 | 0.67 | 5.94 | 59.4 |
| PPO | — | 3.52 | 16.71 | 80.81 | 4.59 | 4.76 | 17.61 |
| PPOBr20 | — | 3.62 | 18.24 | 88.69 | 3.98 | 5.04 | 22.28 |
| PPOBr40 | — | 5.03 | 23.13 | 118.42 | 5.33 | 4.6 | 22.2 |
| PPOBr60 | — | 4.88 | 24.57 | 139.3 | 5.7 | 5.03 | 24.4 |
| SPPO | 1 | — | 4.1 | 33.6 | — | 5.18 | 34.3 |
| SPPO | 1.8 | — | 2.38 | 14.1 | — | 5.83 | 50.6 |
| Cellulose Acetate | — | — | — | 4.75 | — | — | 33.9 |

These results generally demonstrate that the sulfonated partially brominated PPO materials according to the invention exhibited an improved permeability ratio in comparison with un-substituted PPO, with the partially brominated PPO and, in the case of the high I.E.C. material, also with the equivalent sulfonated un-brominated material (SPPO).

Separation of Gas Mixtures by Modified PPO

The selectivity of a gas mixture comprising 19.3% carbon dioxide and 80.7% methane (as confirmed by mass spectroscopy) was tested for the SPPOBr membranes. Selectivity was calculated as the ratio of the concentration of gases in the permeate. The results are set out in Table 2. Separation factor (a) was calculated as $$a = \frac{(CO2 \text{ mole fraction}/CH4 \text{ mole fraction})_{permeate}}{(CO2 \text{ mole fraction}/CH4 \text{ mole fraction})_{feed}}$$

TABLE 2

| POLYMER | $CO_2/CH_4$ SEPARATION FACTOR |
| --- | --- |
| SPPOBr60 | 22 |
| SPPOBr40 | 36 |
| SPPOBr20 | 36 |

Thin Film Composite Membrane Preparation and Testing

Thin film composite membranes were prepared by coating the lumen side of hollow fibres with dilute solutions of SPPOBr20 in methanol. The fibres were prepared from Ultem 1000 (Trade Mark), a polyetherimide (PEI) ex. General Electric Company following the known procedure described by Kniefel and Peinemann. A bundle of 2 to 4 fibres were potted on both ends and fitted into steel casings using Swagelok (Trade Mark) fittings. The fibres were open at both ends. A 2% by weight solution of SPPOBr in methanol was pumped through the fibres at the rate of 2 ml/min by means of a syringe pump. The solution was allowed to reside within the fibre lumen for 5 to 10 minutes after which excess of it was drained out. The coating process was repeated two more times. The period for which the coating solution was left in the fibre lumen for the second and the third layer of coating was however changed to 2 and 0.5 minutes respectively. The coated layers were dried overnight under ambient conditions and with a slow stream of air blowing through the lumen. The performance data (at 100 psig) are shown in the following Table 3.

TABLE 3

| Module No.: | 1 | 2 | 3 | 4 |
|---|---|---|---|---|
| Surface area (cm$^2$) | 27.38 | 13.83 | 15.21 | 27.97 |
| Pure gas permeability (GPU) | | | | |
| CO$_2$ | 38.28 | 79.30 | 108.50 | 64.90 |
| CH$_4$ | 0.65 | 1.44 | 2.50 | 1.33 |
| Selectivity CO$_2$/CH$_4$ | 58.51 | 55 | 43.4 | 48.7 |
| CO$_2$/CH$_4$ gas mixture | | | | |
| CO$_2$ % in feed | 20.30 | 20.30 | 20.30 | 20.30 |
| CO$_2$ % in permeate | 83.26 | 81.89 | 77.95 | 70.88 |
| CO$_2$ % in residue | — | — | — | — |
| Total flux GPU | 4.09 | 2.51 | 7.62 | 2.87 |

What is claimed is:

1. A process of forming a permeable gas separation membrane comprising:

sulphonating a partially brominated poly (2, 6-dimethyl-1, 4-phenylene oxide) having 20% to 60% bromination in a non-polar solvent with sufficient sulphonating agent to nominally sulphonate at least some of the un-reacted repeat units in the partially brominated poly (2, 6-dimethyl-1, 4-phenylene oxide) whereby a modified polymer is formed;

coating a membrane substrate with a solution of the modified polymer in a solvent; and allowing the solvent to evaporate.

2. The process according to claim 1, wherein the concentration of said partially brominated PPO in said non-polar solvent is less than 10% by weight.

3. The process according to claim 1, wherein the resulting sulfonic acid groups are balanced by a monovalent counter-ion.

4. The process according to claim 3 wherein the monovalent counter-ion is selected from the group consisting of H$^+$, Na$^+$, K$^+$ and Li$^+$.

5. The process according to claim 1, wherein the resulting sulfonic acid moieties are balanced by divalent or trivalent counter-ions.

6. The process according to claim 5 wherein said divalent or trivalent counter-ions are selected from the group consisting of Mg$^{+2}$, Ca$^{+2}$, Ba$^{+2}$ and Al$^{+3}$.

7. A method of separating component gases from a gas mixture, comprising contacting said gas mixture with a gas separation material formed by the process according to claims 1.

8. The method according to claim 1, wherein acid gases are separated from a natural gas or other hydrocarbon-containing gas system.

9. A gas separation material as formed by the process according to claim 1.

* * * * *